Patented Aug. 7, 1951

2,563,784

UNITED STATES PATENT OFFICE 2,563,784

INTERPOLYMERIZATION OF VINYL AROMATIC COMPOUND AND OIL-MODIFIED ALKYD IN THE PRESENCE OF SULFUR

Wallace Thomas Craven Hammond, Homerton, London, England, assignor, by mesne assignments, to The Sherwin-Williams Company, Cleveland, Ohio, a corporation of Ohio No Drawing. Application May 4, 1949, Serial No. 91,419. In Great Britain August 22, 1946

12 Claims. (Cl. 260—22)

This invention relates to a process for making interpolymers of aromatic vinyl hydrocarbons and drying oil-modified alkyd resins.

For the purpose of the present disclosure, the term "aromatic vinyl hydrocarbons" is intended to cover styrene as well as those derivatives of styrene in which alkyl radicals and/or halogen atoms comprise constituents in the vinyl chain or in the benzene ring. Such compounds may be $\alpha$ or $\beta$ chlorostyrene, o, m or p-ethyl styrene or o, m or p-chlorostyrene and the like.

The present invention is based on the discovery that the interpolymerization of an aromatic vinyl hydrocarbon with a drying oil-modified alkyd resin can be controlled by carrying out the interpolymerization reaction in the presence of a small amount of sulphur. The products so produced have very advantageous properties when used in coating compositions such as paints, varnishes, enamels, emulsion paints and in impregnating compositions.

According to the present invention, an aromatic vinyl hydrocarbon and a drying oil-modified alkyd resin are heated with a small amount of sulphur at polymerizing temperatures, the sulfur being present in an amount of from about ½% to about 5% by weight calculated on the fatty acid radicals of the modified alkyd resin. Preferably the amount of sulfur used in carrying out the present process is from about 1% to about 2½% by weight calculated on the fatty acid radical content of the resin.

The drying oil-modified alkyd resin is present in an amount of from about 10% to about 70% by weight of the reaction mixture, and preferably from about 25% to 65% by weight of the mixture.

The expression "polymerizing temperatures" as used herein refers to those temperatures at which polymerization proceeds at an appreciable rate, such temperatures ordinarily being above about 130° C.

We have found that it is essential that the three ingredients, namely, the aromatic vinyl hydrocarbon, the drying oil-modified alkyd resin, and the sulfur should be present in the reaction mixture before it is heated to a polymerizing temperature, that is to say, it is important that the sulfur should not be heated to polymerizing temperatures with only one of the other two components before adding the third component. It will be understood that the other two components may be heated together at temperatures below that at which polymerization occurs, for example, the aromatic vinyl hydrocarbon and the drying oil-modified alkyd resin may be heated together at a temperature below the polymerization temperature, the sulfur then added and the temperature then raised to effect polymerization. We have found, however, that provided a portion of the sulfur is added to the mixture of the aromatic vinyl hydrocarbon with the modified alkyd resin before heating to a polymerizing temperature, any opacity in the product which may develop during the earlier stages of the polymerization reaction can be overcome by the addition of a further quantity of sulfur and further heating of the reaction mixture to produce further polymerization of the ingredients.

A feature of the invention, therefore, consists in that a part only of the sulfur is present in the initial mixture and the residue of the sulfur is added prior to the completion of the reaction.

A further feature of the invention consists in that said mixture is heated under reflux until it attains a temperature of at least 200° C. Generally speaking, the interpolymerization reaction is completed in about 10 hours under these conditions.

It will be appreciated that the proportions of the aromatic vinyl hydrocarbon to the drying oil-modified alkyd resin may be varied without necessitating any variation in the ratio of the sulfur to the fatty acid radical content of the mixture. In general, an amount of 1% sulfur (by weight of the unsaturated fatty acid radical content of the resin) is the minimum amount which will produce a bright, clear, homogeneous product having little or no opalescence.

We have found that an amount of sulfur of one and one-third per cent by weight of the fatty acid radical content of the modified alkyd resin will produce a bright clear bead by the process of this invention. If amounts of sulfur of 2½% or more are added, the color of the final interpoylmer is liable to be impaired and tends to darken. The use of the higher quantities of sulfur also impedes the reaction more than where less sulfur is used, so that a longer reaction time is required. Also, the final viscosity of the reaction mixture is lower when the higher quantities of sulfur are used. Therefore, it is possible, by controlling the amount of sulfur used, to produce products having the same viscosity with different oil lengths, although the products obtained by utilizing the higher quantities of sulfur may be darker in color as compared with the products obtained by utilizing a smaller proportion of sulfur with a mixture having a greater oil length.

A still further feature of the invention consists in that the reaction may be carried out in a volatile solvent; in such a case the interpolymerization reaction proceeds at an appreciably slower rate and consequently needs a longer period for the production of a product of a given content of polymerized aromatic vinyl hydrocarbon.

The products of the present invention can readily be dissolved in aromatic solvents but the tolerance for mineral solvents, such as mineral spirits, is more limited and, in general, the tolerance of the product for a solvent such as mineral spirits is about the ratio of 1:1.

A further feature of the invention consists in that the modified alkyd resin contains the radicals of at least one unsaturated fatty acid. The resins may also include conjugated triene fatty acid radicals in admixture with unsaturated fatty acid radicals of other types.

A still further feature of the invention consists in that the interpolymerization reaction is effected at temperatures up to 250° C. under superatmospheric pressure, preferably at pressures of from 20 to 80 pounds per square inch gauge pressure, at which pressures the reaction temperature will range from about 155° C. to 250° C.

If desired, conventional driers can be incorporated with the interpolymer so as to accelerate the air-drying of films produced therefrom, but we have found that, when the drier is a compound of a metal which reacts with sulfur to form a sulfide, it is desirable that the mixture of interpolymer and drier should not be heated at an elevated temperature as the sulfur appears to be somewhat loosely bound and might be precipitated as the sulfide of the metal, so impairing the color of the product. Other driers, however, appear to have no such effect when the mixture is heated. Cobalt, when used in the form of a compound such as cobalt naphthenate, appears to be the best drier.

The following examples will illustrate the manner of carrying out the present invention. The quantities referred to are parts by weight.

*Example I.*—An alkyd resin modified with drying-oil fatty acids was prepared as follows:

A reaction mixture consisting of 285 grams of linseed oil fatty acids, 120 grams of glycerol and 203 grams of phthalic anhydride was heated under a blanket of carbon dioxide gas so that the temperature was raised to 260° C. during a period of ½ hour; the reaction mixture was then held at this temperature for 1 hour in order to body the reaction product.

150 grams of the alkyd prepared as described above were then mixed with 75 grams of styrene and 1 gram of finely divided sulfur was stirred into the mixture.

The reaction mixture was then heated under reflux utilizing a water-trap, the heating being so regulated that the reaction temperature reached 205° C. after 4 hours. The reaction mixture was then cooled to 100° C. and was thinned with 150 grams of xylol to produce a varnish which was a clear mobile liquid having a viscosity of 40 seconds in a Ford No. 4 cup at 25° C. and containing 53% by weight of solids.

When the conventional lead and cobalt naphthenate driers had been added in the cold to the varnish thus produced, slightly opalescent films could be formed therefrom which air-dried to a stage in which they were touch dry in 3 hours.

*Example II.*—An oil-modified pentaerythritol alkyd resin was prepared by heating together a reaction mixture containing 250 grams of pentaerythritol, 310 grams of phthalic anhydride and 560 grams of linseed oil fatty acids under an atmosphere of carbon dioxide in such a way that the temperature of the reaction mixture was raised to 260° C. in ¾ hour, the reaction mixture being held at that temperature for 1 hour in order to body the reaction product.

250 grams of the alkyd thus prepared were then mixed with 125 grams of styrene and 1.75 grams of finely divided sulfur were then added.

The reaction mixture was then heated under reflux using a water-trap so that the temperature rose to 175° C. over a period of 3 hours. When the reaction mixture was cooled and thinned with 375 grams of xylol, a clear varnish resulted which had a viscosity of 200 seconds on a Ford No. 4 cup at 25° C., the solids content of the varnish being 43% by weight.

On addition of the conventional cobalt and lead naphthenate driers in the cold, films could be poured from the resin which became touch dry in 1 hour and formed a tough, clear film.

*Example III.*—A mixture of the oil-modified pentaerythritol alkyd as produced in Example II with the oil-modified glycerol alkyd produced as described in Example I were mixed in the proportions of 112 grams of the pentaerythritol alkyd to 175 grams of the glycerol alkyd. To this mixture of the two alkyd resins there were added 137 grams of styrene and 2.5 grams of finely divided sulfur.

The reaction mixture was heated under reflux for 5 hours when the temperature reached 170° C. At this point, frothing and bodying made continued heating of the reaction mixture impracticable and the reaction mixture was thereupon cooled and thinned with 400 grams of xylol.

The solution thus produced was a varnish having a 50% by weight solids content and a viscosity of 90 seconds in a Ford No. 4 cup at 25° C.

Films poured from this varnish formed a slightly opalescent film which became touch-dry in 1 hour, it being unnecessary to add any of the conventional driers.

*Example IV.*—A linseed oil glycerol alkyd resin of a 60% oil length was mixed with styrene in the proportions of 400 grams of the alkyd resin and 160 grams of styrene. 3 grams of finely divided sulfur were then added and the reaction mixture was placed in an autoclave and heated to a temperature of 200° C. in ½ hour; the pressure recorded on the gauge of the autoclave was 48 pounds per square inch. The autoclave was maintained at a temperature of 200° C. for 2 hours during which time the pressure reading fell to 21 pounds per square inch.

The gases in the autoclave were then vented and the reaction product was cooled and thinned with 373 grams of xylol to a theoretical solids content of 60%.

The varnish thus produced had a solids content of 59.7% showing a substantially complete interpolymerization of the styrene with the oil-modified alkyd resin.

The varnish had a viscosity of 40 seconds in a Ford No. 4 cup at 25° C. and films poured therefrom dried overnight, with the aid of the conventional cobalt and lead naphthenate driers to produce a clear, slightly soft film.

*Example V.*—400 grams of a 60% oil-length linseed oil-glycerol alkyd resin were dissolved in 260 grams of xylol and 120 grams of styrene were added to the solution. 3.6 grams of sulphur were then added to the reaction mixture which was heated under reflux utilizing a water-trap for a period of 20 hours.

The reaction product was a clear solution having a solids content of 64% by weight and a viscosity of 240 seconds in a Ford No. 4 cup at 25° C. This solution was a varnish from which, on addition of the conventional cobalt and lead naphthenate driers, a tough, flexible, slightly opalescent film is obtained on air-drying, the film being dry in 1½ hours.

*Example VI.*—400 grams of a 60% oil-length linseed oil-glycerol alkyd resin were dissolved in 200 grams of xylol and 200 grams of styrene were added thereto.

3.6 grams of sulfur were then added to the reaction mixture which was placed in an autoclave and heated for 2½ hours at a temperature of 200° C.; at the conclusion of this heating period, the autoclave was vented and a clear solution having a solids content of 73% by weight was withdrawn from the autoclave. This solution was a varnish having a viscosity of 300 seconds in a Ford No. 4 cup at 25° C. and, after the addition of the conventional cobalt and lead naphthenate driers, formed clear, hard, flexible films on air-drying, the film drying in 1 hour.

*Example VII.*—An oil-modified alkyd resin derived from mixed polyhydric alcohols was prepared by mixing together 1350 grams of castor oil, 300 grams rosin, 891 grams phthalic anhydride and 331 grams of glycerol. This mixture was heated up to 520° F. in one hour and was held at this temperature to effect dehydration of the castor oil. 64 grams of pentaerythritol were then added slowly while maintaining the temperature at 520° F. This temperature was maintained for one hour and the alkyd resin was then allowed to cool.

400 grams of the above oil-modified alkyd resin were then mixed with 200 grams of styrene and 2.4 grams of sulfur. This mixture was heated under reflux, using a water trap, for 3½ hours at which time the temperature had risen to 203° C. The product was a clear, very viscous, dark resin having a non-volatile content of 87%. When the product was thinned to a 67% solution in xylol, it gave clear, flexible films which air-dried without driers in 4 hours and, when stoved at 220° F., it produced a hard, tough film in ½ hour.

*Example VIII.*—An oil-modified alkyd resin was prepared by mixing together 1200 grams of castor oil, 150 grams of rosin, 1167 grams of phthalic anhydride and 498 grams of glycerol. This mixture was heated to 520° F. and maintained at this temperature for 2 hours to effect dehydration of the castor oil and bodying of the resin. 280 grams of this alkyd resin were mixed with 280 grams of styrene and 4 grams of sulfur. This mixture was heated under reflux for 3 hours, at which time the temperature had risen to 170° C. Further heating was impractical since the viscosity had greatly increased. The resulting resin had the solids content of 75% which represents 33% styrene in the copolymer. When this resin is thinned to a 60% solution, it yields clear films which air-dried in 30 minutes without driers.

*Example IX.*—1500 grams of castor oil, 965 grams of phthalic anhydride and 535 grams of glycerine were heated to a temperature of 265° C. and held at this temperature for 1¼ hours to effect dehydration of the castor oil.

600 grams of this alkyd resin were mixed with 400 grams of styrene and 4.5 grams of powdered sulfur. The mixture was heated under reflux for 5½ hours until the temperature had reached 210° C. The resulting product, when cooled, was straw colored, slightly opalescent, and had a high viscosity and contained 93% non-volatiles. When this resin was thinned with xylene to a 50% solids content, a clear solution was obtained having a viscosity of 80 seconds in a No. 4 Ford cup at 25° C. This solution produced films which air-dried in ½ hour and which stoved in ½ hour at 105° C. to give a clear, tough, flexible film. This resin, which is compatible with melamine formaldehyde and urea-formaldehyde resins, will, when mixed therewith, produce films of considerably improved surface hardness on baking.

The interpolymer prepared by the process of the present invention are particularly valuable for use as a film-forming ingredient for use in the manufacture of surface-coating compositions and the interpolymers can be compounded with pigments, extenders, solvents or driers to produce various coating compositions and the present invention includes surface-coating compositions comprising as a film-forming ingredient the interpolymers produced by the process of this invention.

It will be understood that, where a clear varnish is required, the amount of sulfur to be added to the mixture of the aromatic vinyl hydrocarbon and the drying oil-modified alkyd resin must be such as will produce a bright bead but it will be appreciated that, where a pigmented composition is to be produced, a slight opacity or opalescence in the product is not disadvantageous and products produced utilizing 1% or less of sulfur, to a minimum of ½% by weight of the fatty acid compound, can still be utilized as the film-forming ingredient of a pigmented surface-coating composition wherein an extremely high gloss is not required.

What is claimed is:

1. A process for the manufacture of an interpolymer of an aromatic monovinyl compound and a drying oil-modified alkyd resin which comprises heating a reaction mixture of a compound selected from the group consisting of aromatic monovinyl hydrocarbons, and halogen substituted aromatic monovinyl hydrocarbons, a drying oil-modified alkyd resin and sulfur at polymerizing temperatures, the sulfur being present in an amount of from about ½% to about 5% by weight of the fatty acid radical content of said modified alkyd resin and said resin being present in an amount of from about 10% to about 70% by weight of the reaction mixture.

2. A process as claimed in claim 1 wherein the sulfur is present in an amount of from about 1% to about 2½% by weight of the fatty acid radical content of said modified alkyd resin.

3. A process as claimed in claim 1 wherein the sulfur is present in an amount of about 1⅓% by weight of the fatty acid radical content of said modified alkyd resin.

4. A process as claimed in claim 1 wherein said modified alkyd resin is present in an amount of from about 25% to about 65% by weight of the reaction mixture.

5. A process as claimed in claim 1 wherein said reaction mixture is heated under reflux until a temperature of at least 200° C. is attained.

6. A process as claimed in claim 1 wherein the reaction is carried out in the presence of a volatile solvent.

7. A process as claimed in claim 1 wherein the reaction is carried out under superatmospheric pressure.

8. A process as claimed in claim 1 wherein the aromatic monovinyl hydrocarbon is styrene.

9. A process as claimed in claim 1 wherein the drying oil-modified alkyd resin is a linseed oil-modified alkyd resin.

10. A process as claimed in claim 1 wherein the resin is a castor oil modified alkyd resin.

11. A process as claimed in claim 1 wherein the modified alkyd resin is a glycerol alkyd resin.

12. A process as claimed in claim 1 wherein the resin is a pentaerythritol alkyd resin.

WALLACE THOMAS CRAVEN HAMMOND.

REFERENCES CITED

The following references are of record in the file of this patent:

UNITED STATES PATENTS

| Number | Name | Date |
|---|---|---|
| 2,104,760 | Renfrew | Jan. 11, 1938 |
| 2,219,862 | Bradley et al. | Oct. 29, 1940 |
| 2,305,224 | Patterson | Dec. 15, 1942 |
| 2,395,504 | Rubens et al. | Feb. 26, 1946 |
| 2,453,665 | Kropa | Nov. 9, 1948 |
| 2,457,768 | Arvin et al. | Dec. 28, 1948 |

FOREIGN PATENTS

| Number | Country | Date |
|---|---|---|
| 431,768 | Great Britain | of 1935 |
| 549,303 | Great Britain | Nov. 16, 1942 |